W. R. Jones,
Boring Hubs,
Nº 8,267.    Patented July 22, 1851.
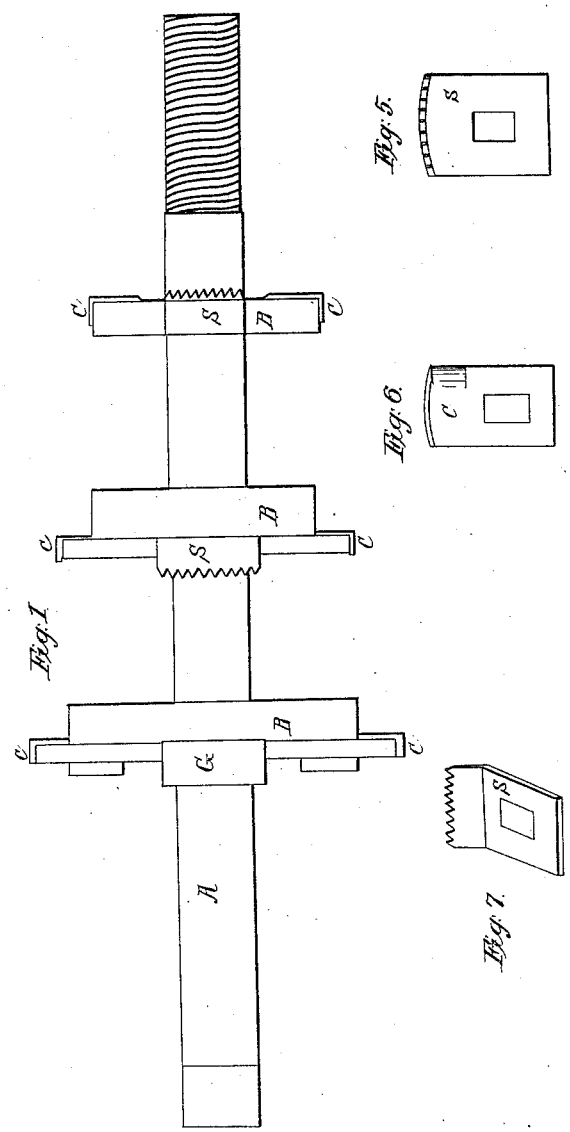
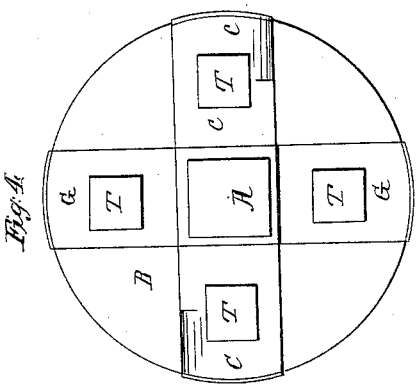
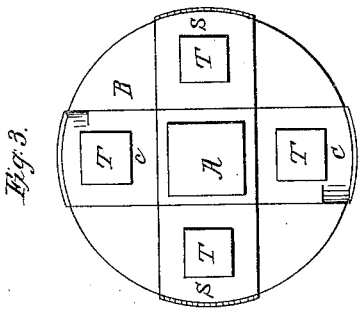
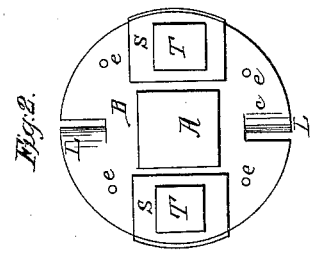

UNITED STATES PATENT OFFICE.

WILLIAM R. JONES, OF GRANVILLE, NEW YORK.

MACHINE FOR PREPARING HUBS FOR BOXES.

Specification of Letters Patent No. 8,267, dated July 22, 1851.

*To all whom it may concern:*

Be it known that I, WILLIAM R. JONES, of Granville, in the county of Washington and State of New York, have invented a new and useful instrument called the "Adjustable Auger" for the purpose of boring smooth round holes in the sides of ships where shot may have made rough and irregular holes, and for letting in boxes for the hubs of wheels, and for sinking the heads and collars of bolts; and I hereby declare that the following is a full, clear, and true description of the same.

To enable others to understand and to make this instrument I would refer to the drawings herewith presented which drawings constitute a part of the description.

Figure 1, it may be observed, is a square arbor fitted with three burs or disks of different dimensions. The first or smaller bur is a circular disk of steel, in its center is a square hole fitted snugly on the arbor. This disk has two cutting edges formed by notching into two opposite sides (see L L Fig. 2). These edges are chamfered down thin and sunk below the face of the disk; this disk has also two recesses sunk in its upper side to receive two saws S S, seen at Fig. 1 and at Fig. 2. These saws are secured in their places by the screws T T and have their teeth turned downward; this disk has also two slyes of steel used as cutters on top of the saws, these have slots or mortises for the screws so as to be movable a little outward from the center in order to cut a larger or small circle, there are also four small pins projecting downward from the under side of the disk which I use as guides while setting in the instrument and which will mar the hub only on the part to be cut away. The second or middle sized bur is a circular disk of metal having a shoulder or flange; the lower part is to fit the hole just cut by the smaller bur, its upper side has four recesses furnished with two cutters and with two saws all movable secured by screws L L; these saws may be used as gages to steady the instrument by turning their teeth upward as shown at Fig. 1. The third is a larger disk of metal also furnished with cutters and gages movable and secured in the same way in order to cut still larger circles. On the lower end of the arbor a screw is cut by which it may be forced forward and the upper end is fitted for a crank.

Fig. 5 is a top view of the saw detached from the disk. Fig. 7 is an oblique view of the same. Fig. 6 is the cutter also detached.

Now in using this instrument I first bore a hole of suitable size for the arbor to pass through or if the hub has a hole too large (which is commonly the case) I put a plug in the lower end and bore a hole through the plug to fit the round part of the arbor then put on the first bur, put in the arbor and screw on the nut, this brings the disk down to the end of the hub, place the four small pins in a circle that is made concentric with the hub, these guide the bur until the saws have entered and will mark or disfigure the part only which is to be cut out, then screw back the pins out of the way and by turning the crank the whole is carried forward and the cutter forms a completely even shoulder for the box to fit on, or if it is desirable to cut a larger hole the second disk is just fitted exactly to follow the hole cut by the first and the movable cutters enables me to cut any sized hole required. I use one, two, or more burs at one time as the case may require and thereby cut three different sized holes at once.

Now what I claim as new—

Is the combination of the movable cutters with the saws and small pins arranged and operating substantially in the manner and for the purpose herein described.

I do not claim the cutters singly or the arbor or disk or the saw, such things having been used separately before.

In testimony whereof I have hereto subscribed my name in presence of two witnesses.

WM. R. JONES.

Witnesses:
W. THOMPSON,
JOHN COX.